United States Patent
Xing et al.

(10) Patent No.: US 10,276,118 B2
(45) Date of Patent: Apr. 30, 2019

(54) DRIVING METHOD AND DRIVER CIRCUIT FOR IN-CELL TOUCH DISPLAY PANEL

(71) Applicant: Wuhan China Star Optoelectronics Technology Co., Ltd., Wuhan (CN)

(72) Inventors: Zhenzhou Xing, Wuhan (CN); Wei Chen, Wuhan (CN); Chunning Qiao, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 231 days.

(21) Appl. No.: 15/119,728

(22) PCT Filed: Jul. 15, 2016

(86) PCT No.: PCT/CN2016/090111
§ 371 (c)(1),
(2) Date: Aug. 18, 2016

(87) PCT Pub. No.: WO2017/215068
PCT Pub. Date: Dec. 21, 2017

(65) Prior Publication Data
US 2018/0182335 A1   Jun. 28, 2018

(30) Foreign Application Priority Data
Jun. 14, 2016 (CN) .......................... 2016 1 0424983

(51) Int. Cl.
*G09G 3/36* (2006.01)
*G02F 1/1333* (2006.01)
(Continued)

(52) U.S. Cl.
CPC ....... *G09G 3/3677* (2013.01); *G02F 1/13338* (2013.01); *G02F 1/13454* (2013.01);
(Continued)

(58) Field of Classification Search
CPC ...... G06F 3/0416; G06F 3/0412; G06F 3/044; G06F 2203/04104; G06F 3/041
(Continued)

(56) References Cited

U.S. PATENT DOCUMENTS 9,626,028 B2 *   4/2017   Li ........................ G06F 3/0412
9,690,419 B2 *   6/2017   Zhang ................... G11C 19/28
(Continued)

FOREIGN PATENT DOCUMENTS

CN     103943083 A     7/2014
CN     104503618 A     4/2015

*Primary Examiner* — Koosha Sharifi-Tafreshi
(74) *Attorney, Agent, or Firm* — Leong C. Lei (57) ABSTRACT

The invention provides a driving method and driver circuit for in-cell touch display panel. The method comprises: Step 10: providing a GOA circuit, comprising a plurality of cascade GOA units; Step 20: controlling the n-th stage GOA unit to charge the n-th horizontal scan line of the touch display panel following a preset timing sequence; Step 30: dividing GOA units into first and second types of GOA units, with each first type GOA unit corresponding to a first horizontal scan line at which a next scanning starting after completing a TP scanning, and the remaining GOA units as second type GOA unit; Step 40: the size of first type GOA unit being greater than the circuit of second type GOA unit to provide a greater thrust to corresponding scan line than second type GOA unit. As such, the uneven display phenomenon of in-cell touch display panel is improved.

11 Claims, 7 Drawing Sheets

(51) Int. Cl.
*G02F 1/1345* (2006.01)
*G06F 3/041* (2006.01)
*G06F 3/044* (2006.01)

(52) U.S. Cl.
CPC .......... *G06F 3/0412* (2013.01); *G06F 3/0416* (2013.01); *G09G 3/3648* (2013.01); *G06F 3/044* (2013.01); *G09G 2310/0264* (2013.01); *G09G 2310/0286* (2013.01); *G09G 2310/0297* (2013.01); *G09G 2320/0214* (2013.01); *G09G 2320/0233* (2013.01)

(58) Field of Classification Search
USPC .................................................. 345/173, 174
See application file for complete search history.

(56) References Cited

U.S. PATENT DOCUMENTS

| | | | |
|---|---|---|---|
| 9,703,413 B2* | 7/2017 | Zhang | G06F 3/0416 |
| 2016/0190522 A1* | 6/2016 | Lee | H01L 51/0097 257/40 |
| 2017/0115808 A1* | 4/2017 | Cho | G06F 3/0412 |

\* cited by examiner

DRIVING METHOD AND DRIVER CIRCUIT FOR IN-CELL TOUCH DISPLAY PANEL

BACKGROUND OF THE INVENTION

1. Field of the Invention

The present invention relates to the field of display, and in particular to a driving method and driver circuit for in-cell touch display panel.

2. The Related Arts

As the display technology rapidly develops, the touch display panel is widely accepted and used in many applications. At present, the touch display panel can be categorized into: add-on mode touch panel, and in-cell touch panel, wherein the add-on touch panel is to manufacture the touch panel and liquid crystal display (LCD) separately, and then attached together to form an LCD with touch control functions, which has the disadvantages of low transmittance, and thicker module. The in-cell touch panel is to embed the touch electrodes of the touch panel into the LCD to reduce the module thickness and improve light transmittance, and thus become a dominant technology.

Figure 1:
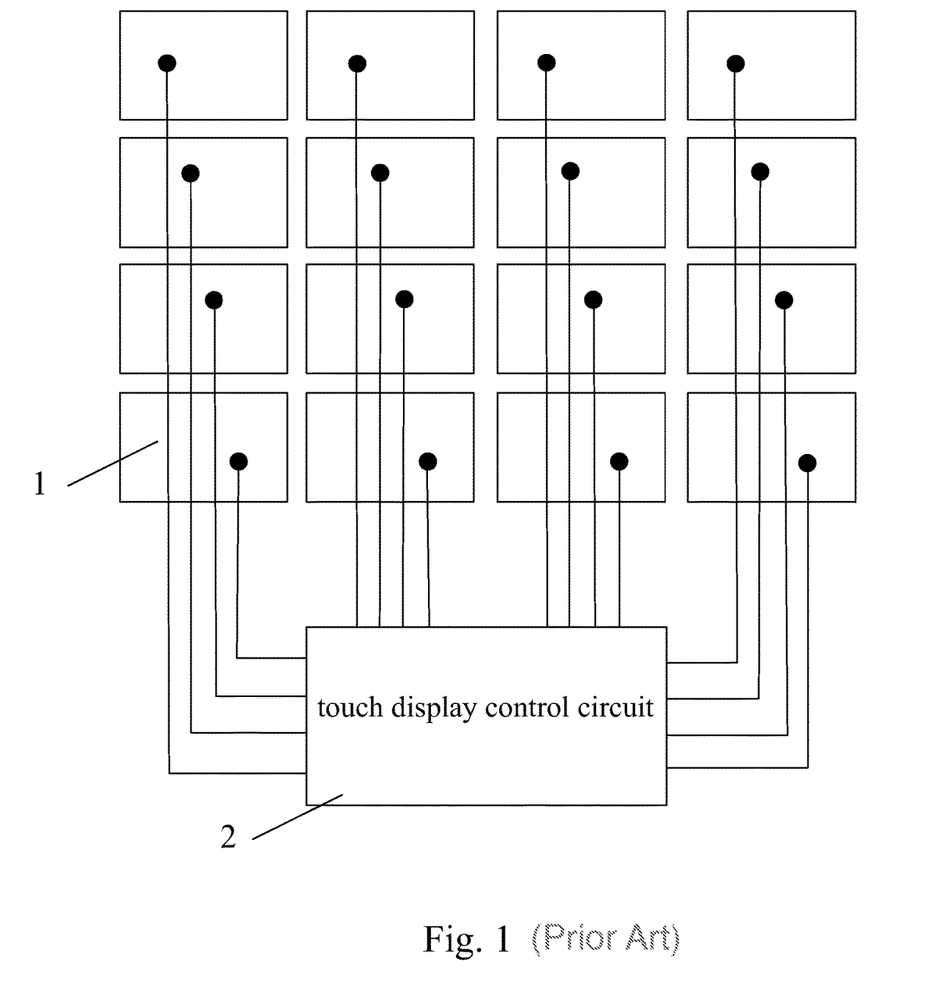
FIG. 1 is a schematic view showing the structure of the sensing pad of a known in-cell touch display panel.

Refer to FIG. 1. FIG. 1 is showing a schematic view of the structure of a sensing pad for a known touch display panel. The common voltage (VCOM) indium-tin-oxide (ITO) layer corresponding to the sensor array is divided into a plurality of ITO pads 1 as the sensor pads for touch control sensing, and is connected to the touch display control circuit 2.

The operating principle of the LC panel is as follows: disposing LC molecules between two parallel glass substrates, and applying a driving voltage on the two glass substrates to control the rotation direction of the LC molecules to reflect the light emitted from the backlight module to display images. In the active LCD panel, each pixel comprises a thin film transistor (TFT), with the gate connected to a horizontal scan line (gate line), the drain connected to a vertical data line, and the source connected a pixel electrode. By applying a sufficient voltage to the horizontal scan line, all the TFTs on the line will be turned on so that the pixel electrode of the horizontal scan line will be connected to the vertical data line so as to write the display signal on the data line into the pixel to control the transmittance of the different LCs to achieve color control. At present, the common approach is to manufacture the driver circuit of the horizontal scan line in the gate-on-array (GOA) circuit at the active area peripheral on the substrate to achieve driving the horizontal scan line.

In short, the GOA circuit usually comprises a plurality of cascade GOA units, with each stage of GOA unit corresponding to a stage of horizontal scan line. The main structure of the GOA unit comprises a pull-up circuit, a pull-up control circuit, a downstream circuit, a pull-down circuit, a pull-down maintain circuit, and a bootstrap capacitor responsible for uplifting voltage. The pull-up circuit is mainly for outputting the clock signal as a gate signal; the pull-up control circuit is for controlling the turn-on time for the pull-up circuit, and is generally connected to the downstream signal propagated from the previous stage GOA circuit or gate signal; the pull-down circuit is for pulling the gate voltage to low at a first time, i.e., turning off gate signal; the pull-down maintain circuit is for maintaining the gate output signal and the gate signal of the pull-up circuit (called Q point) turned off (i.e., negative level); in general, there are two pull-down maintain modules operate alternatingly; the bootstrap capacitor is for a second time uplifting of the Q point, which is beneficial for the output of the pull-up circuit.

Figure 2:
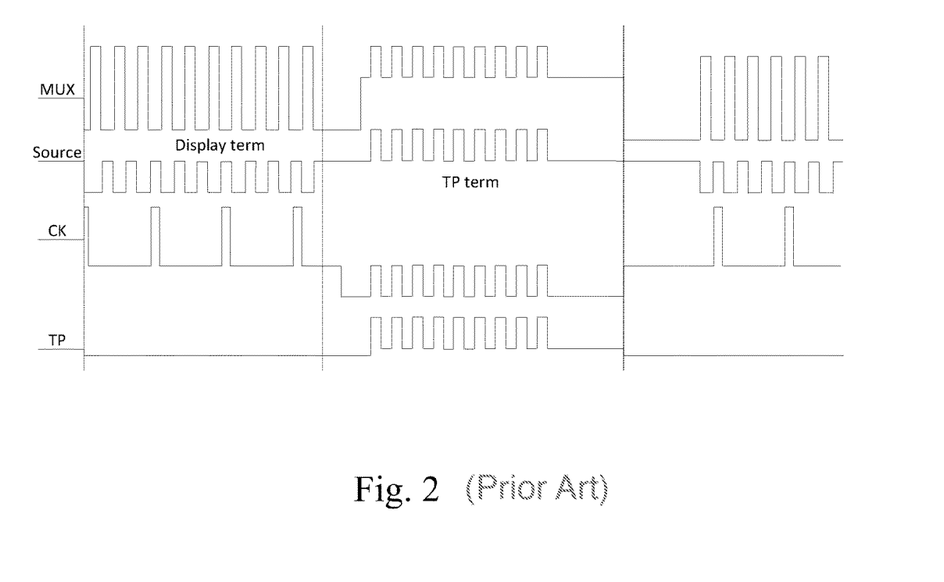
FIG. 2 is a schematic view showing the GOA timing sequence for a known in-cell touch display panel.

At present, the in-cell touch display panel usually uses time-sharing scanning between display and touch panel (TP) terms; i.e., a gate scanning N lines, followed by scanning a portion of TP, and following by another gate scanning N lines, and so on, until a frame finishes displaying. As shown in FIG. 2 of a schematic view of GOA timing sequence for a known in-cell LCD, the scanning is divided into a plurality of display terms and TP terms. When the in-cell touch display panel turns on the TP function, VGL cannot shut down the gate thin film transistor (TFT), and in TP term, the voltage of the pixel leaks current through the source line because the MUX TFT is turned on (and GOA signal is turned off).

Figure 3:
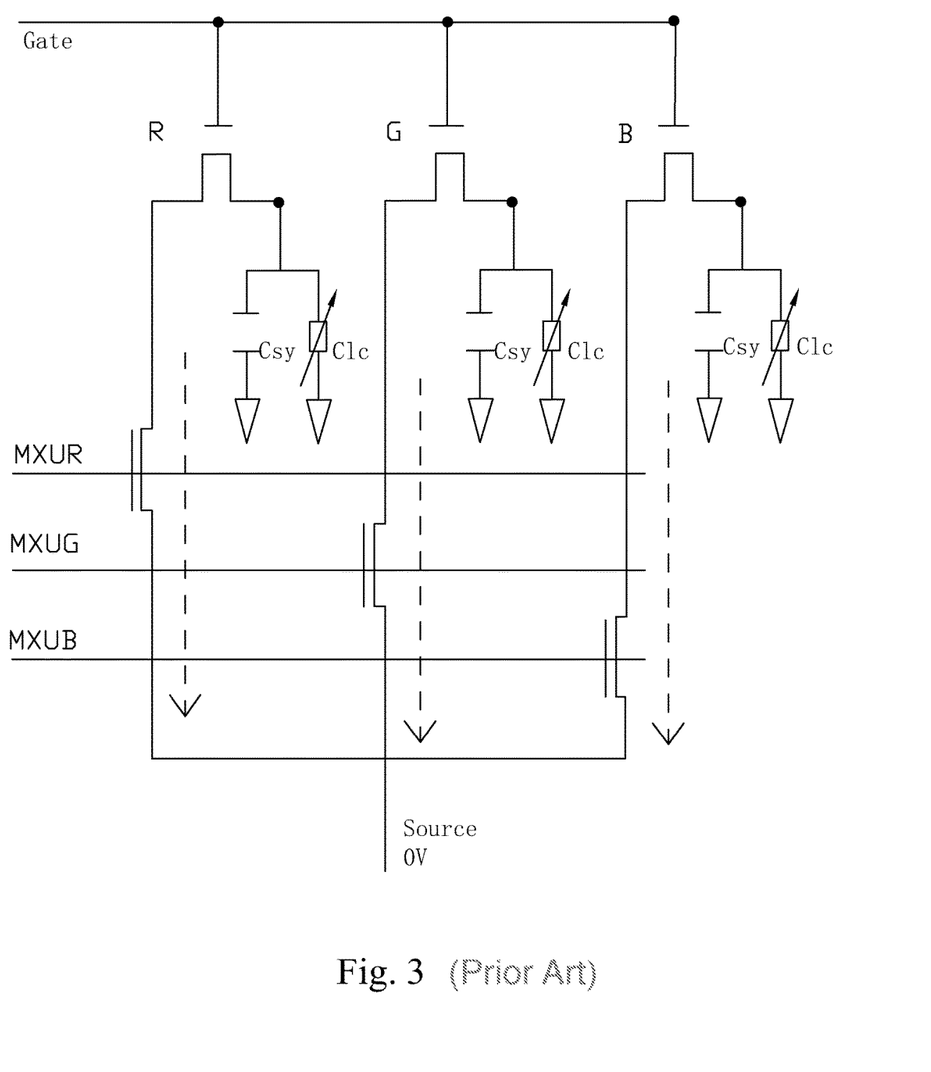
FIG. 3 is a schematic view showing the pixel discharging through the source line after turning on TP function for a known in-cell touch display panel.

FIG. 3 is a schematic view showing the pixel discharging through the source line when the known in-cell touch display panel turning on TP function. When display term stops and TP terms starts, the gate is maintained at the state of low voltage (VGL), and the source stays at grounded (0V). After a period of time, the current leakage occurs (as shown by the dash arrow).

Figure 4:
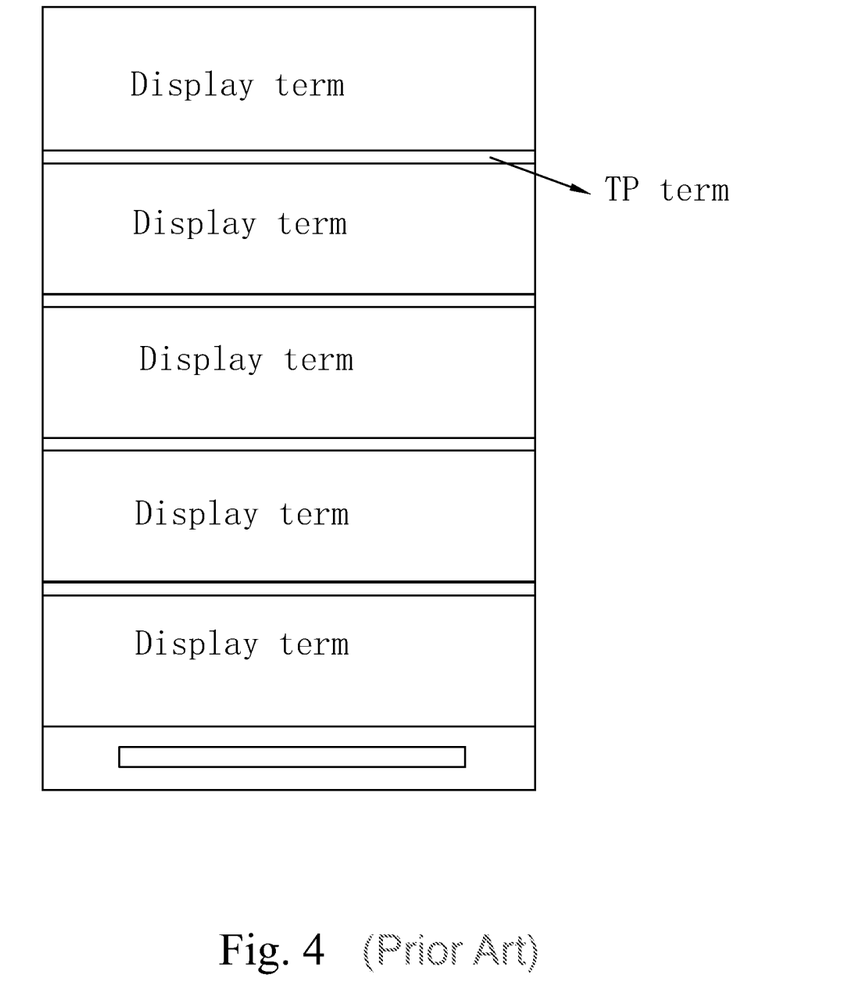
FIG. 4 is a schematic view showing the uneven display phenomenon in a known in-cell touch display panel.

FIG. 4 is a schematic view showing the uneven display of the known in-cell touch display panel.

According to the timing sequence, the gates of the first to N-th lines are scanned during the display term, and then the display term stops for the TP term to takes over. As the current leakage occurs during TP term, after completing the TP term scanning, during the scanning of (N+1)-th line starts in the next display term, the gate signal of the (N+1)-th line will become insufficient in providing thrust to push the (N+1)-th pixel to fully charged, leading to a lower luminance of the (N+1)-th line. In other words, every time the TP terms starts, the luminance of the line become less luminous due to current leakage, leading to uneven display.

SUMMARY OF THE INVENTION

The object of the present invention is to provide a driving method for in-cell touch display panel to improve the uneven display phenomenon of the in-cell touch display panel.

Another object of the present invention is to provide a driver circuit for in-cell touch display panel to improve the uneven display phenomenon of the in-cell touch display panel.

To achieve the above object, the present invention provides a driving method for in-cell touch display panel, which comprises: Step 10: providing a GOA circuit, the GOA circuit comprising a plurality of cascade GOA units; Step 20: controlling the n-th stage GOA unit to charge the n-th horizontal scan line of the touch display panel according to a preset timing sequence; Step 30: dividing the plurality of GOA units into a first type GOA unit and a second type GOA unit, with each first type GOA unit corresponding to a first horizontal scan line at which a next scanning starting after completing a touch panel (TP) scanning, and the remaining GOA units as the second type GOA unit; Step 40: the circuit size of the first type GOA unit being greater than the circuit size of the second type GOA unit so that the first type GOA unit providing a greater thrust to corresponding horizontal scan line than the second type GOA unit.

In a preferred embodiment, the GOA circuit is a CMOS GOA circuit.

In a preferred embodiment, compared to the second type GOA unit, the first type GOA unit comprises at least an inverter more.

In a preferred embodiment, the inverter comprises a PMOS and an NMOS, the gates of the PMOS and NMOS are connected to form the input end, the source of the PMOS is connected to a high voltage, the source of the NMOS is connected to a low voltage, and the drains of the PMOS and NMOS are connected to from the output end.

In a preferred embodiment, the touch display panel is a hybrid in-cell touch display panel or a full in-cell touch display panel.

To achieve the above object, the present invention also provides a driver circuit for in-cell touch display panel, which comprises: a GOA circuit, the GOA circuit comprising a plurality of cascade GOA units; controlling the n-th stage GOA unit to charge the n-th horizontal scan line of the touch display panel according to a preset timing sequence; dividing the plurality of GOA units into a first type GOA unit and a second type GOA unit, with each first type GOA unit corresponding to a first horizontal scan line at which a next scanning starting after completing a touch panel (TP) scanning, and the remaining GOA units as the second type GOA unit; wherein the circuit size of the first type GOA unit being greater than the circuit size of the second type GOA unit so that the first type GOA unit providing a greater thrust to corresponding horizontal scan line than the second type GOA unit.

In a preferred embodiment, the GOA circuit is a CMOS GOA circuit.

In a preferred embodiment, compared to the second type GOA unit, the first type GOA unit comprises at least an inverter more.

In a preferred embodiment, the inverter comprises a PMOS and an NMOS, the gates of the PMOS and NMOS are connected to form the input end, the source of the PMOS is connected to a high voltage, the source of the NMOS is connected to a low voltage, and the drains of the PMOS and NMOS are connected to from the output end.

In a preferred embodiment, the touch display panel is a hybrid in-cell touch display panel or a full in-cell touch display panel.

To achieve the above object, the present invention also provides a driver circuit for in-cell touch display panel, which comprises: a GOA circuit, the GOA circuit comprising a plurality of cascade GOA units; controlling the n-th stage GOA unit to charge the n-th horizontal scan line of the touch display panel according to a preset timing sequence; dividing the plurality of GOA units into a first type GOA unit and a second type GOA unit, with each first type GOA unit corresponding to a first horizontal scan line at which a next scanning starting after completing a touch panel (TP) scanning, and the remaining GOA units as the second type GOA unit; wherein the circuit size of the first type GOA unit being greater than the circuit size of the second type GOA unit so that the first type GOA unit providing a greater thrust to corresponding horizontal scan line than the second type GOA unit; wherein the GOA circuit being a CMOS GOA circuit; wherein compared to the second type GOA unit, the first type GOA unit comprising at least an inverter more.

In summary, the driving method and driver circuit for in-cell touch display panel provided by the present invention can improve the uneven display phenomenon of the in-cell touch display panel.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 5:
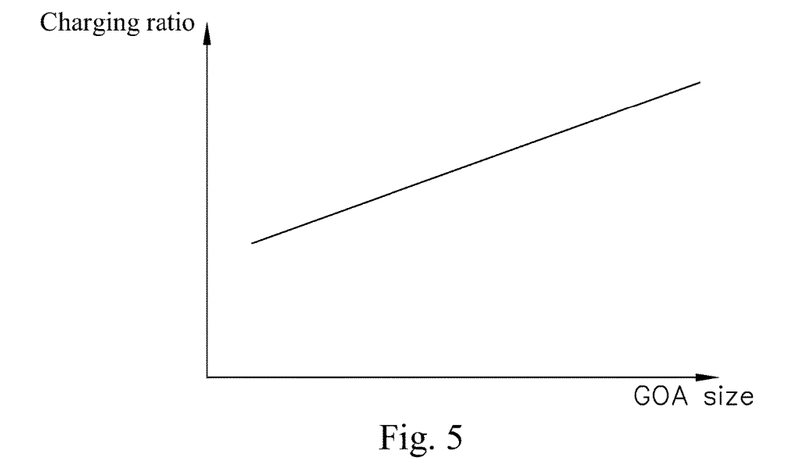
FIG. 5 is schematic view showing the relation between the GOA circuit size and charging ratio.

Refer to FIG. 5. FIG. 5 shows the relation between the GOA size and charging ratio, wherein the charging ratio increases as the GOA size increases. The present invention increases the GOA size for the lines of the in-cell touch display panel wherein the lines show abnormal display. By increasing the GOA size to increase the thrust to make more charges into the line, the extra charges can compensate the charge loss due to current leakage.

Figure 6:
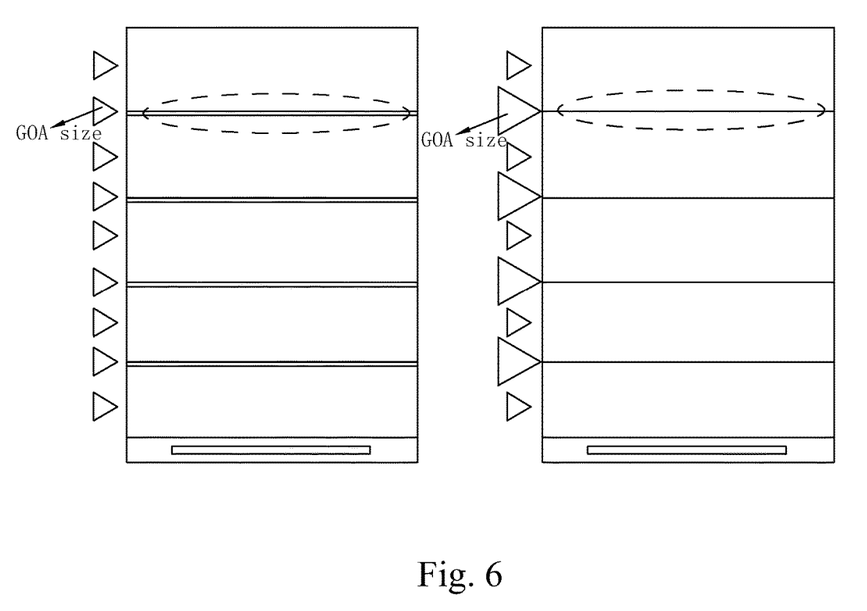
FIG. 6 is a schematic view showing the relation of the before-and-after increasing GOA size and display.

Refer to FIG. 6. FIG. 6 is a schematic view showing the relation of the before-and-after increasing GOA size and display. FIG. 6 uses triangles of different sizes to indicate GOA sizes. As shown in FIG. 6, the GOA size is increased for the lines showing abnormal display due to TP term starting. In comparison, the increased GOA size will improve the charging ratio of the pixel to inject more charges during the same period of time so as to compensate the abnormal display caused by pixel current leakage through source line when TP term starts.

Figure 7:
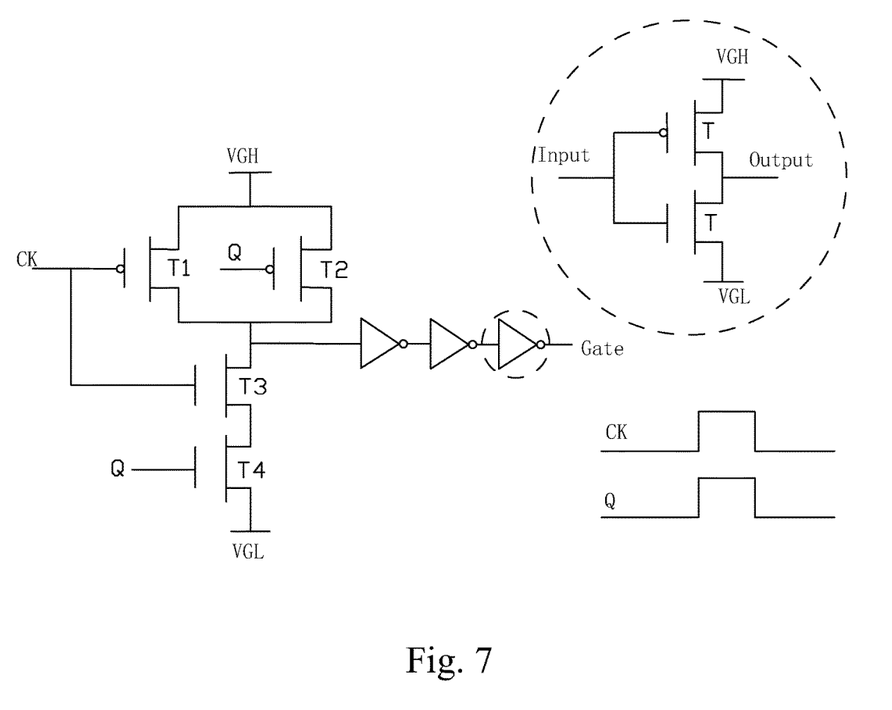
FIG. 7 is a schematic view showing the driver circuit for in-cell touch display panel provided by a preferred embodiment of the present invention.

Refer o FIG. 7. FIG. 7 is a schematic showing a preferred embodiment of a driver circuit for in-cell touch display panel. The present invention is designed for in-cell touch display panel with time-sharing driving structure, and is therefore applicable to both hybrid in-cell and full in-cell types of touch display panels.

The driver circuit for in-cell touch display panel of the present invention comprises: a GOA circuit, the GOA circuit comprising a plurality of cascade GOA units; controlling the n-th stage GOA unit to charge the n-th horizontal scan line of the touch display panel according to a preset timing sequence; dividing the plurality of GOA units into a first type GOA unit and a second type GOA unit, with each first type GOA unit corresponding to a first horizontal scan line at which a next scanning starting after completing a touch panel (TP) scanning, and the remaining GOA units as the second type GOA unit; wherein the circuit size of the first type GOA unit being greater than the circuit size of the second type GOA unit so that the first type GOA unit providing a greater thrust to corresponding horizontal scan line than the second type GOA unit. The preset timing sequence is the time-sharing driving timing sequence of the touch display.

FIG. 7 uses CMOS GOA circuit as an example to explain the present invention, and only the enlarged GOA unit is drawn, wherein the dash line indicates the enlarged part. Because the feature of the present invention is to increase the GOA size for the lines showing abnormal display when TP term starts instead of the actual structure of the GOA circuit, the present invention is applicable to all known types of GOA circuits. In FIG. 7, the specific design for increasing the GOA size is to make the first type GOA circuit to more comprise at least an inverter, which is easy to implement. The inverter comprises a PMOS and an NMOS, the gates of the PMOS and NMOS are connected to form the input end, the source of the PMOS is connected to a high voltage, the source of the NMOS is connected to a low voltage, and the drains of the PMOS and NMOS are connected to from the output end.

Figure 8:
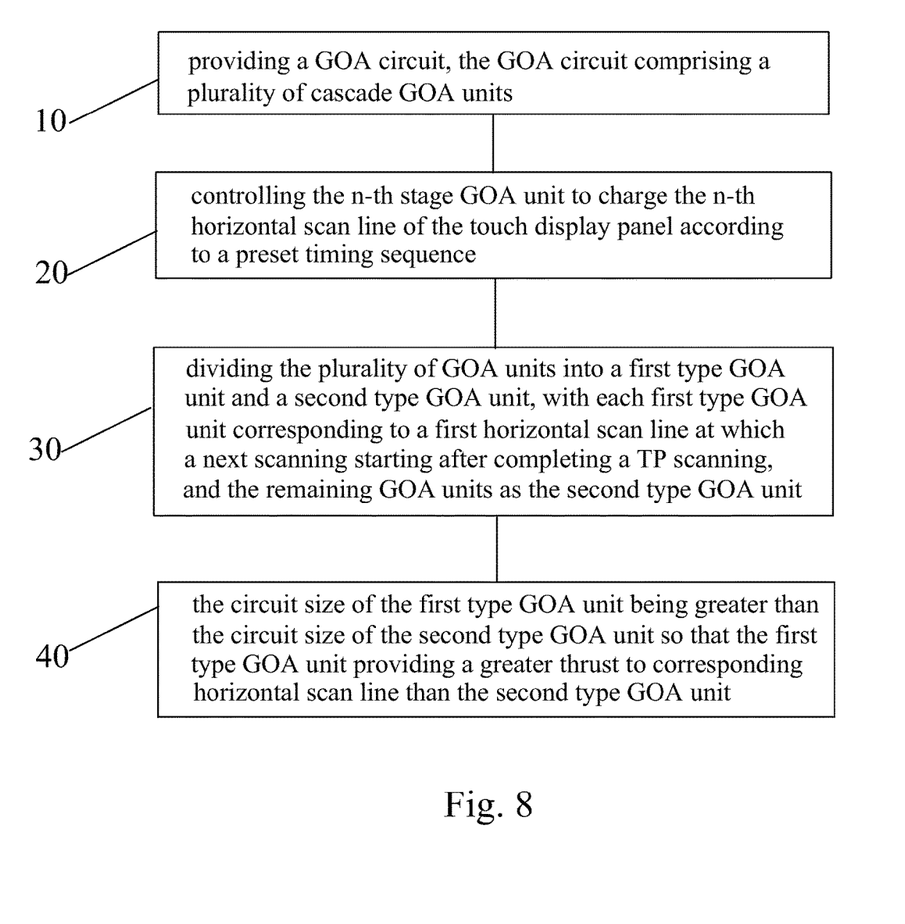
FIG. 8 is schematic view showing the flowchart of the driving method for in-cell touch display panel provided by a preferred embodiment of the present invention.

Refer to FIG. 8. FIG. 8 shows a flowchart of a driving method for in-cell touch display panel, which comprises:

Step 10: providing a GOA circuit, the GOA circuit comprising a plurality of cascade GOA units.

Step 20: controlling the n-th stage GOA unit to charge the n-th horizontal scan line of the touch display panel according to a preset timing sequence.

Step 30: dividing the plurality of GOA units into a first type GOA unit and a second type GOA unit, with each first type GOA unit corresponding to a first horizontal scan line at which a next scanning starting after completing a touch panel (TP) scanning, and the remaining GOA units as the second type GOA unit.

Step 40: the circuit size of the first type GOA unit being greater than the circuit size of the second type GOA unit so that the first type GOA unit providing a greater thrust to corresponding horizontal scan line than the second type GOA unit.

In summary, the driving method and driver circuit for in-cell touch display panel provided by the present invention can improve the uneven display phenomenon of the in-cell touch display panel.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A method for driving an in-cell touch display panel, which comprises a gate-on-array (GOA) circuit comprising a plurality of GOA units that are arranged in a cascade fashion to respectively define cascade stages and are respectively connected to and corresponding to horizontal scan lines, the GOA units comprising a number of first type GOA units and at least one second type of GOA unit arranged next to each of the first type GOA units, the method comprising the following steps:

controlling one of the first type GOA units to charge the horizontal scan line of the touch display panel corresponding thereto according to a preset timing sequence;

sequentially controlling the at least one second type of GOA unit that is arranged next to the one of the first type GOA units to charge the horizontal scan line corresponding thereto until a next TP term reaches; and carrying out a touch panel scanning operation in the next TP term;

wherein the first type GOA unit has a circuit size that is greater than a circuit size of the second type GOA unit so that the first type GOA unit provides a greater thrust to the corresponding horizontal scan line than the second type GOA unit; and wherein the circuit size of the first type GOA unit is made greater than the circuit size of the second type GOA unit by additionally including at least one inverter.

2. The driving method for in-cell touch display panel as claimed in claim 1, wherein the GOA circuit is a CMOS GOA circuit.

3. The driving method for in-cell touch display panel as claimed in claim 1, wherein the at least one inverter comprises a PMOS and an NMOS, and the PMOS and NMOS have gates that are connected to form an input end, the PMOS having a source that is connected to a high voltage, the NMOS having a source that is connected to a low voltage, the PMOS and NMOS having drains that are connected to from an output end.

4. The driving method for in-cell touch display panel as claimed in claim 1, wherein the touch display panel is a hybrid in-cell touch display panel or a full in-cell touch display panel.

5. A driver circuit for in-cell touch display panel, which comprises: a gate-on-array (GOA) circuit, which comprises a plurality of cascade GOA units that are respectively connected to and corresponding to horizontal scan lines of the touch display panel to respectively charge the horizontal scan lines of the touch display panel according to a preset timing sequence; the plurality of GOA units comprising a first type GOA unit and at least one second type GOA unit arranged next to the first type GOA unit in a cascade direction, wherein the first type GOA unit is configured to carry out a scanning operation for charging the horizontal scan line corresponding thereto immediately after a touch panel (TP) scanning operation is completed, and the at least one second type GOA unit is configured to sequentially carry out a scanning operation for charging the horizontal scan line corresponding thereto after the scanning operation of the first type GOA circuit; wherein the first type GOA unit has a circuit size that is greater than a circuit size of the second type GOA unit so that the first type GOA unit provides a greater thrust to the corresponding horizontal scan line than the second type GOA unit;

wherein the circuit size of the first type GOA unit is made greater than the circuit size of the second type GOA unit by additionally including at least one inverter.

6. The driver circuit for in-cell touch display panel as claimed in claim 5, wherein the GOA circuit is a CMOS GOA circuit.

7. The driver circuit for in-cell touch display panel as claimed in claim 6, wherein the at least one inverter comprises a PMOS and an NMOS, and the PMOS and NMOS have gates that are connected to form an input end, the PMOS having a source that is connected to a high voltage, the NMOS having a source that is connected to a low voltage, the PMOS and NMOS having drains that are connected to from an output end.

8. The driver circuit for in-cell touch display panel as claimed in claim 5, wherein the touch display panel is a hybrid in-cell touch display panel or a full in-cell touch display panel.

9. A driver circuit for in-cell touch display panel, which comprises: a gate-on-array (GOA) circuit, which comprises a plurality of cascade GOA units that are respectively connected to and corresponding to horizontal scan lines of the touch display panel to respectively charge the horizontal scan lines of the touch display panel according to a preset timing sequence; the plurality of GOA units comprising a first type GOA unit and at least one second type GOA unit arranged next to the first type GOA unit in a cascade direction, wherein the first type GOA unit is configured to carry out a scanning operation for charging the horizontal scan line corresponding thereto immediately after a touch panel (TP) scanning operation is completed, and the at least one second type GOA unit is configured to sequentially carry out a scanning operation for charging the horizontal scan line corresponding thereto after the scanning operation of the first type GOA circuit; wherein the first type GOA unit has a circuit size that is greater than a circuit size of the second type GOA unit so that the first type GOA unit provides a greater thrust to the corresponding horizontal scan line than the second type GOA unit;

wherein the GOA circuit being a CMOS GOA circuit;

wherein the circuit size of the first type GOA unit is made greater than the circuit size of the second type GOA unit by additionally including at least one inverter.

10. The driver circuit for in-cell touch display panel as claimed in claim 9, wherein the at least one inverter comprises a PMOS and an NMOS, and the PMOS and NMOS have gates that are connected to form an input end, the PMOS having a source that is connected to a high voltage, the NMOS having a source that is connected to a low voltage, the PMOS and NMOS having drains that are connected to from an output end.

11. The driver circuit for in-cell touch display panel as claimed in claim 9, wherein the touch display panel is a hybrid in-cell touch display panel or a full in-cell touch display panel.

* * * * *